UNITED STATES PATENT OFFICE.

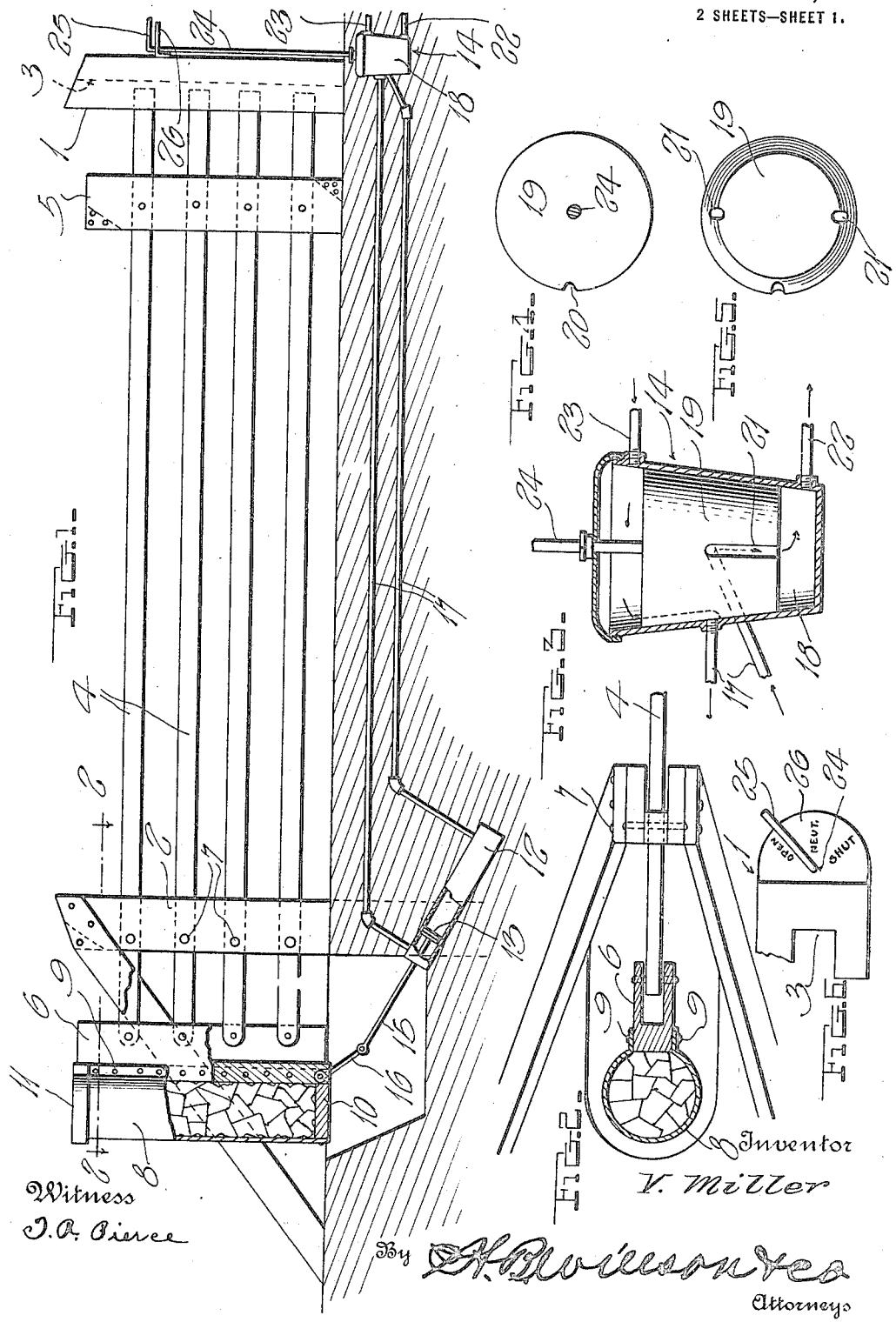

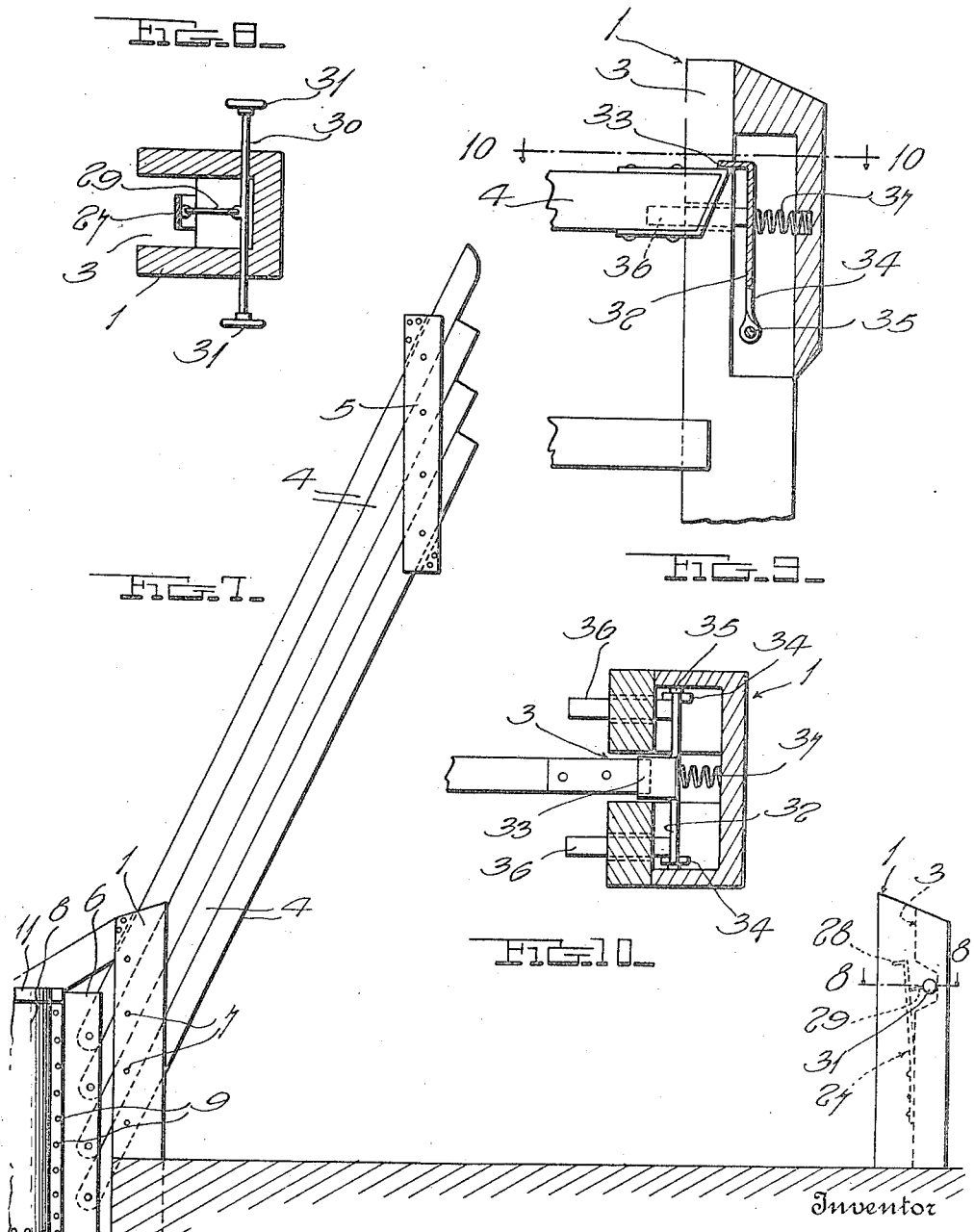

VICTOR MILLER, OF ST. PAUL, MINNESOTA.

GATE.

1,253,510.　　　Specification of Letters Patent.　　Patented Jan. 15, 1918.

Application filed April 12, 1917. Serial No. 161,513.

*To all whom it may concern:*

Be it known that I, VICTOR MILLER, a citizen of the United States, residing at St. Paul, in the county of Ramsey and State of Minnesota, have invented certain new and useful Improvements in Gates; and I do declare the following to be a full, clear, and exact description of the invention, such as will enable others skilled in the art to which it appertains to make and use the same.

My invention has for its object to provide a simply constructed and inexpensive yet a highly efficient and durable gate which opens upwardly so that it is not necessary for vehicles and horses to stop at a specified distance therefrom before the gate can be opened.

With the foregoing general object in view, the invention resides in certain novel features of construction and unique combinations of parts to be hereinafter fully described and claimed, the descriptive matter being supplemented by the accompanying drawings which constitute a part of this application and in which:

Figure 1 is a side elevation, partly in section, of the improved gate in closed position and showing the application of fluid-pressure operating means for closing and opening the gate at will;

Fig. 2 is a detail horizontal section on the plane of the line 2—2 of Fig. 1;

Fig. 3 is a vertical section of the control valve of said fluid-pressure operating means;

Figs. 4 and 5 are respectively upper and lower end views of the valve plug;

Fig. 6 is a top plan view of the post coöperating with the free end of the gate and illustrating more particularly the arrangement of the handle for controlling the valve;

Fig. 7 is a side elevation of the improved gate constructed without mechanical operating means and showing the same in open position;

Fig. 8 is a detail horizontal section on the plane of the line 8—8 of Fig. 7, illustrating more particularly the latch for holding the gate in lowered position;

Fig. 9 is a detail vertical section showing a different form of latch; and

Fig. 10 is a detail vertical section on the plane of the line 10—10 of Fig. 9.

In the drawings above briefly described, the numerals 1 and 2 designate suitably constructed gate posts, the latter coöperating with the free edge of the gate and having a vertical groove or the like 3 for receiving the same when lowered. The post 1 is preferably constructed of two vertical sections spaced apart and receiving therebetween one end of the gate, said gate being composed of a plurality of horizontal bars 4 pivoted at their ends to vertical bars 5 and 6, whereby they may move parallelogrammatically, said bars being pivoted at 7 to the post 2 adjacent the bar 6 and the latter being provided with a weight 8 having a tendency to open the gate.

The bar 6 is preferably of the channel-shaped formation shown, the ends of the bars 4 being mounted in the channel thereof, and although the weight 8 could well be of any preferred construction, it is preferably in the form of a vertically elongated housing formed of a single sheet of metal bent into substantially C-shape in horizontal section with its edges secured by nails, screws or the like 9 to the opposed sides of the bar 6. A suitable bottom 10 and a removable top 11 are provided for the housing in order that the latter may be filled with rock, scraps of iron, or any other suitable material.

In Fig. 1 a fluid-pressure cylinder 12, piston 13, and control valve 14 are shown for operating the gate mechanically, the piston being connected with the lower end of bar 6 by a piston rod 15 and link 16 and the cylinder being embedded in the earth. Pipes 17 extend to the opposite ends of the cylinder 12 from the casing 18 of the valve 14, the valve proper 19 being in the form of a tapering plug having a vertical passage 20 in its periphery adapted to carry fluid pressure from the upper end of the housing 18 into either pipe 17, according to the position to which said plug is turned. Opening through the lower end of plug 19 and also formed in the periphery thereof, are two exhaust ports 21 adapted to establish communication between either pipe 17 and the lower end of the casing 18, this end of said casing being provided with an exhaust pipe 22 while the upper end thereof is equipped with a pressure inlet 23. It is intended that water pressure shall be used but it is obvious that compressed air, steam or the like could well be employed. Regardless of the pressure used, movement of the plug 19 to one position will cause the piston 13 to be forced downwardly to open the gate, whereas turning of said plug to an opposed position will cause reversal of the piston to close said gate. Also, by turning the plug to a neutral position, the gate may be held in a partly opened position.

A vertical shaft 24 rises from the plug 19 at one side of the post 2 and is provided on its upper end with a laterally extending handle 25 which operates above a sector 26 in order that the plug may be set at any required position.

When fluid-pressure means is employed for operating the gate, it is unnecessary to provide any locking means for the latter since it will remain in open, closed or a partially opened position. In some types of the invention, however, no mechanical arrangement is provided for operating the gate as will be clear from Fig. 7. It then becomes essential to provide some type of latch and although the latter could well be of any suitable construction, one of the two types shown and described is preferably used. In Figs. 7 and 8 the latch is in the form of a flat spring 27 secured at its lower end in the groove 3 while its upper end is provided with a laterally extending nose 28 coöperating with the free end of the uppermost bar 4. By means of a chain or other flexible connection 29, the spring 27 is connected to the center of a rod 30 passing across the groove 3 and having knobs 31 on its ends. It will thus be obvious that by turning either knob, the chain will be wound on the rod 30 to move the spring 27 to an inoperative position, whereupon the weight 8 will come into play to open the gate.

The latch shown in Figs. 9 and 10 is in the form of a vertical plate 32 having a nose 33 on its upper edge coacting with the upper bar 4 whereas the lower edge of said plate is provided with a pair of depending arms 34 mounted on a transverse rod or the like 35. Studs 36 project from the plate 32 through the inner side of the post so that said plate may be forced inwardly against the tension of the spring 37 in order to release said latch, said spring normally serving to hold said latch in operative position.

From the foregoing, taken in connection with the accompanying drawings, it will be obvious that although the invention is of comparatively simple and inexpensive nature, it will be highly efficient and durable, particular emphasis being laid upon the fact that it is not necessary to stop vehicles and horses any specified distance from the gate before the latter is opened, this being due to the fact that the gate moves upwardly rather than swinging horizontally. The several novel features of construction shown and described, produce the desired results in probably the most effective manner and therefore constitute the preferred form of the gate. It is to be undersood, however, that within the scope of the invention as claimed, numerous changes may be made without sacrificing the principal advantages.

I claim:

1. The combination with a vertical post, of a plurality of parallel horizontal bars each pivoted adjacent one end to said post for vertical swinging, and a vertically elongated weight to which all of said ends are pivoted.

2. The combination with a vertical post, of a plurality of horizontal bars pivoted thereto adjacent one end for a vertical swinging, vertical bars to which said ends of said horizontal bar are pivoted, and a vertically elongated housing secured to said vertical bar and adapted to contain a heavy material to serve as a weight.

3. The combination with a vertical post, of a plurality of parallel horizontal bars pivoted adjacent one end to said post for vertical swinging, a vertically elongated weight pivoted to said ends of the bars, a vertical bar to which the other ends of said horizontal bars are pivoted, a piston having a piston rod connected with the lower end of said weight, a cylinder in which said piston is mounted, said cylinder being embedded in the earth below the gate, pipes for admitting fluid pressure into either end of said cylinder and for simultaneously exhausting the pressure from the other end thereof, and a valve for controlling said pipes.

4. The combination with a vertical post, of a plurality of horizontal bars pivoted to said post adjacent one end, a vertical bar to which said ends of said bars are pivoted, a vertically elongated casing formed of a single sheet of metal bent into substantially cylindrical shape and having its edges secured to the opposite sides of said vertical bar, said casing being adapted to contain a suitable quantity of heavy material to act as a weight, and having a bottom to support such material.

In testimony whereof I have hereunto set my hand in the presence of two subscribing witnesses.

VICTOR MILLER.

Witnesses:
 MAGNUS LARSON,
 ANDREW J. NEUGREN.